United States Patent
Thomas et al.

(10) Patent No.: US 6,996,197 B2
(45) Date of Patent: Feb. 7, 2006

(54) METHOD AND APPARATUS FOR REDUCING INTERFERENCE WITHIN A COMMUNICATION SYSTEM

(75) Inventors: Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 9 days.

(21) Appl. No.: 10/919,198

(22) Filed: Aug. 16, 2004

(65) Prior Publication Data

US 2005/0058230 A1 Mar. 17, 2005

Related U.S. Application Data

(60) Provisional application No. 60/503,688, filed on Sep. 17, 2003.

(51) Int. Cl.
*H03D 1/04* (2006.01)
*H03D 1/06* (2006.01)
*H03K 5/01* (2006.01)
*H04B 1/10* (2006.01)
*H04L 25/08* (2006.01)

(52) U.S. Cl. .................................................. 375/346
(58) Field of Classification Search ............... 370/203, 370/209, 320; 455/561; 375/346, 316
See application file for complete search history.

(56) References Cited

U.S. PATENT DOCUMENTS

| | | | | |
|---|---|---|---|---|
| 4,495,648 A | * | 1/1985 | Giger | 455/73 |
| 5,063,560 A | * | 11/1991 | Yerbury et al. | 370/335 |
| 5,260,968 A | * | 11/1993 | Gardner et al. | 375/347 |
| 5,524,023 A | * | 6/1996 | Tsujimoto | 375/232 |
| 5,528,581 A | * | 6/1996 | De Bot | 370/203 |
| 5,598,428 A | * | 1/1997 | Sato | 375/148 |
| 5,623,485 A | * | 4/1997 | Bi | 370/209 |
| 5,757,789 A | * | 5/1998 | Dent | 370/337 |
| 6,137,785 A | * | 10/2000 | Bar-Ness | 370/328 |
| 6,141,393 A | | 10/2000 | Thomas et al. | |
| 6,363,262 B1 | * | 3/2002 | McNicol | 455/561 |
| 6,445,735 B1 | * | 9/2002 | Whikehart | 375/232 |
| 6,788,752 B1 | * | 9/2004 | Andre | 375/350 |
| 2002/0150070 A1 | * | 10/2002 | Shattil | 370/342 |
| 2002/0154614 A1 | * | 10/2002 | Jagger et al. | 370/332 |
| 2003/0048800 A1 | * | 3/2003 | Kilfoyle et al. | 370/441 |
| 2003/0072258 A1 | * | 4/2003 | Tarokh et al. | 370/210 |

(Continued)

OTHER PUBLICATIONS

Li, Y.; Sollenberger, N. "Adaptive Antenna Arrays for OFDM Systems With Cochannel Interference" IEEE Transactions on Communications vol. 47, No. 2, Feb. 1999.

(Continued)

*Primary Examiner*—Stephen Chin
*Assistant Examiner*—Jia Lu

(57) ABSTRACT

A method for reducing interference within a communication system is provided herein. A receiver (100), and method for operating a receiver are provided. The receiver operates by utilizing a filter bank (103–104) to partition a wide-band signal into smaller sub-bands. Interference suppression takes place individually on the sub-bands (frequency bands) instead of on the wideband signal as a whole. By using interference suppression on smaller sub-bands, interference suppression techniques can be utilized with less computational complexity than when performing interference suppression on the broadband signal as a whole.

17 Claims, 3 Drawing Sheets

U.S. PATENT DOCUMENTS

| | | | |
|---|---|---|---|
| 2003/0123384 A1 * | 7/2003 | Agee | 370/208 |
| 2003/0179840 A1 * | 9/2003 | Oh et al. | 375/350 |
| 2003/0216122 A1 * | 11/2003 | Cordone et al. | 455/63.1 |
| 2004/0062216 A1 * | 4/2004 | Nicholis et al. | 370/320 |
| 2004/0184570 A1 * | 9/2004 | Thomas et al. | 375/346 |

OTHER PUBLICATIONS

Thomas, T.; Vook, F.; "Asynchronous Interference Suppression in Broad-band Cyclic-Prefix Communications" IEEE WCNC 2003, New Orleans, LA, Mar. 18-20, 2003.

* cited by examiner

100

METHOD AND APPARATUS FOR REDUCING INTERFERENCE WITHIN A COMMUNICATION SYSTEM

FIELD OF THE INVENTION

The present invention relates generally to interference suppression and in particular, to a method and apparatus for reducing interference within a communication system.

BACKGROUND OF THE INVENTION

Interference often hinders performance of communication systems. One type of interference often encountered by a user within a communication system is interference generated by the transmissions of other users. This is typically caused by many users transmitting within the same frequency band, and is referred to as co-channel interference. In order to reduce co-channel interference many communication systems employ a frequency reuse pattern, where transmitters in adjacent cells transmit on different frequencies. However, given the price of spectrum, future communications systems will be characterized by aggressive frequency reuse patterns that will result in significantly increased levels of co-channel interference.

Notwithstanding the above, more and more system operators are taking advantage of unlicensed frequency bands for transmitting information. Because the number of transmitters within an unlicensed frequency band is not restricted, there exists the potential of greatly increased co-channel interference. Additionally, because operators within the unlicensed band do not have to synchronize to a common source, typical co-channel interference is asynchronous in that the interfering signal does not align in time with the desired signal.

Because interference can greatly reduce the efficiency of a communication system, and because interference can be both synchronous and asynchronous, a need exists for a method and apparatus for reducing interference within a communication system.

DETAILED DESCRIPTION OF THE DRAWINGS

Figure 1:
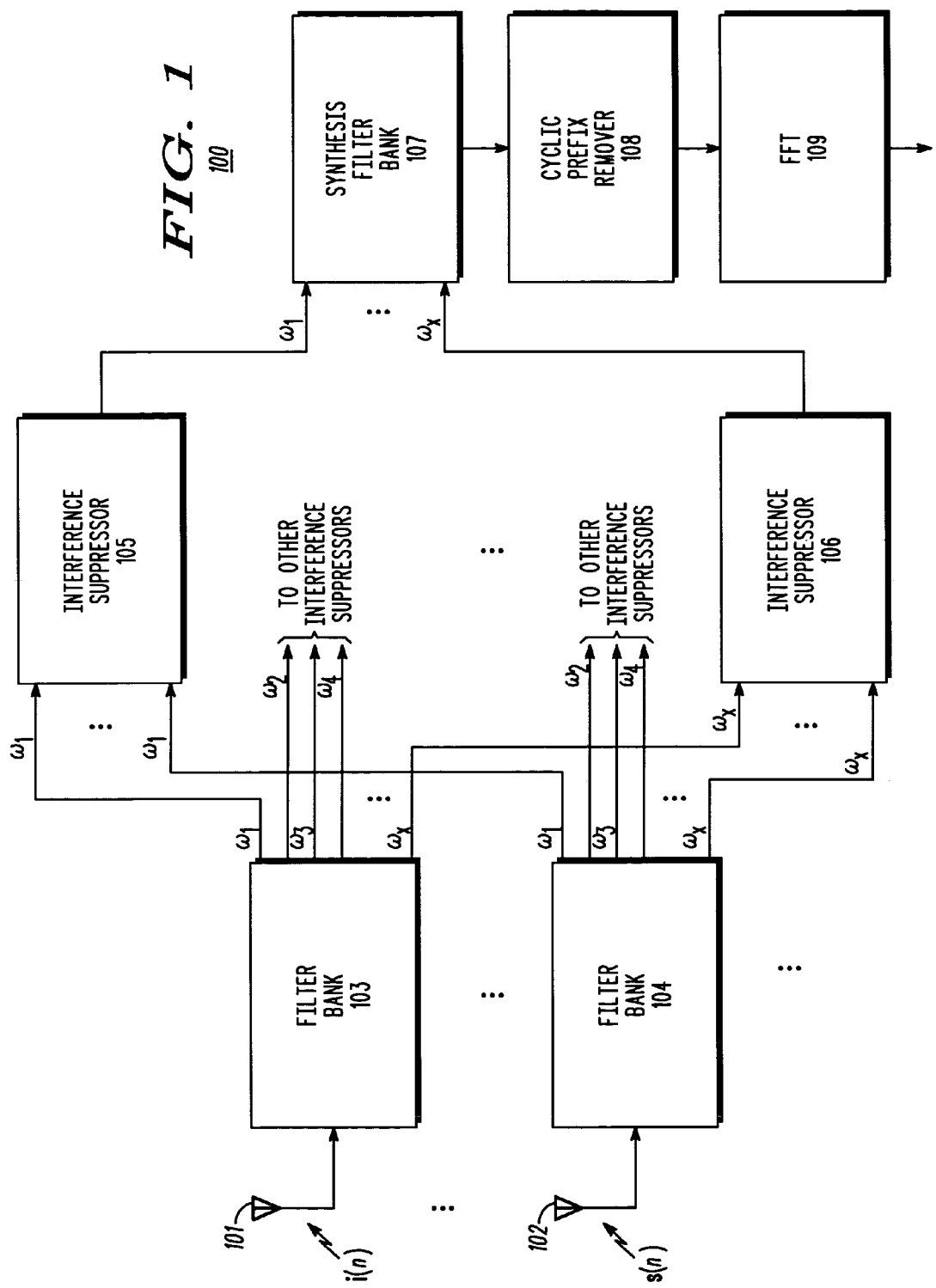
FIG. 1 is a block diagram of a receiver for reducing interference.

In order to address the above-mentioned need, a method and apparatus for interference suppression is provided herein. In particular, a receiver, and method for operating a receiver are provided. The receiver operates by utilizing a filter bank to partition a wide-band signal into smaller sub-bands. Interference suppression takes place individually on the sub-bands (frequency bands) instead of on the wideband signal as a whole. By using interference suppression on smaller sub-bands, interference suppression techniques can be utilized with less computational complexity than when performing interference suppression on the broadband signal as a whole.

The present invention encompasses an apparatus comprising a first antenna outputting a first wideband signal, a second antenna outputting a second wideband signal, a first filter bank coupled to the first antenna, receiving the first wideband signal and outputting a first plurality of narrowband signals, a second filter bank coupled to the second antenna, receiving the second wideband signal and outputting a second plurality of narrowband signals, and an interference suppressor receiving a first narrowband signal from the first filter bank and a second narrowband signal from the second filter bank and outputting an interference-suppressed signal based on the first and the second narrowband signals.

The present invention additionally encompasses an apparatus for interference suppression. The apparatus comprises a first antenna outputting a first wideband signal $r_1(n)$, a second antenna outputting $r_2(n)$, a first filter bank coupled to the first antenna, receiving $r_1(n)$ and outputting X narrowband signals, wherein each narrowband signal has a center frequency of $\overline{\omega}_l (l=1, \ldots, X)$, a second filter bank coupled to the second antenna, receiving $r_2(n)$ and outputting X narrowband signals, wherein each narrowband signal has a center frequency of $\overline{\omega}_l (l=1, \ldots, X)$, a first interference suppressor receiving a first narrowband signal from the first filter bank and a second narrowband signal from the second filter bank and outputting a first interference-suppressed signal based on the first and the second narrowband signals, wherein the first and the second narrowband signals have a same center frequency, and a second interference suppressor receiving a third narrowband signal from the first filter bank and a fourth narrowband signal from the second filter bank and outputting a second interference-suppressed signal based on the third and the fourth narrowband signals, wherein the third and the fourth narrowband signals have a same center frequency.

The present invention additionally encompasses a method comprising the steps of receiving a wideband signal at a first filter bank, receiving the wideband signal at a second filter bank, outputting a first narrowband signal having a first center frequency from the first filter bank based on the wideband signal, and outputting a second narrowband signal having the first center frequency from the second filter bank based on the wideband signal. The first and the second narrowband signals are received and interference suppression is performed on the first and the second narrowband signals.

Turning now to the drawings, wherein like numerals designate like components, FIG. 1 is a block diagram of receiver 100. Receiver 100 utilizes an orthogonal frequency division multiplexing (OFDM) communication system protocol, however in alternate embodiments of the present invention, other system protocols utilizing wideband transmission schemes may be utilized as well. Such other system protocols include, but are not limited to frequency-domain equalized single-carrier systems with cyclic prefixes (called cyclic prefix single carrier) or without cyclic prefixes, code division multiple access (CDMA) systems with cyclic prefixes (called cyclic prefix CDMA) or without cyclic prefixes, multi-carrier CDMA systems, and spread-OFDM systems. As a result, receiver 100 is applicable and effective in OFDM systems, single carrier systems, CDMA systems, and any other similar or hybrid systems.

As shown, receiver 100 comprises at least one receive antenna 101 outputting a wideband signal, at least one filter bank 103–104 receiving the wideband signal, at least one interference suppressor 105–106, a synthesis filter bank 107, a cyclic prefix remover 108, and a fast Fourier transformer (FFT) 109. The exact number of the above elements will vary depending upon the number of signals that are expected to be received simultaneously by the receiver. For simplicity, only two received signals are shown, with s(n) being the signal received from the desired transmitter (i.e., the transmitter whose data the receiver is trying to estimate) and i(n) is the signal received from an interfering transmitter, and n is an integer indicating a discrete time index. (For the illustration purposes, s(n) and i(n) are both column vectors having a length equal to the number of receive antennas.) The desired signal transmitted by the desired transmitter before being corrupted by the channel is referred to as d(n). Although only a single desired transmitted signal is shown, the present invention can also recover multiple data signals sent from a single desired transmitter (or single or multiple data signals sent from multiple desired transmitters). The desired transmitter is also referred to as the desired signal or the desired user. Both s(n) and i(n) are the vectors of the signals received on each receive antenna from the respective transmitters after having been corrupted by their respective channels. It should be noted that s(n) and i(n) may, or may not be synchronized to a common time source. It should also be noted that although a single interfering transmitted signal is shown, the present invention can also suppress multiple interfering signals sent from multiple interfering transmitters.

Regardless of the number of signals simultaneously being received, receiver 100 comprises a single filter bank 103–104 for each channel (antenna 101–102). Each filter bank 103–104 divides the received wideband signal vector r(n)=s(n)+i(n) into a plurality (X) of sub-bands (where the effects of receiver noise have been neglected for clarity). Particularly, where OFDM is utilized, the OFDM bandwidth is divided into small frequency bands such that the received bank breaks up the received M×1 OFDM wideband signal vector, r(n), (where M is the number of receive antennas) into X sub-bands, or narrowband signals, (e.g., 16 sub-bands/narrowband signals). Each sub-band comprises a narrowband signal having a center frequency $\bar{\omega}_l$ (l=1, . . . , X). The narrowband signal at each center frequency may be generated by shifting $r_m(n)$ (where $r_m(n)$ is the received wideband signal from antenna m, i.e., $$r(n) = \begin{bmatrix} r_1(n) \\ \vdots \\ r_M(n) \end{bmatrix})$$

in frequency by $-\bar{\omega}_l$, next filtering by a low-pass filter, f(n), and then decimating by X. The filter, f(n), is chosen so that in the absence of the interference suppressors 105–106 and for a single channel (antenna 101–102), when an arbitrary signal, q(n), that spans the same bandwidth as the OFDM system is input into the filter bank 103–104, the output of the synthesis filter bank 107 equals (or approximately equals) the arbitrary signal q(n). It should be noted that the filter bank operates continuously in a linear convolution fashion as opposed to block processing with circular convolution. In other words, the filter banks operate very differently than traditional OFDM receiver processing where the portion of the received signal corresponding to the cyclic prefix is removed before a block of N time-domain signals is transformed into the frequency domain by an FFT operation. In the present invention, the filter banks are utilized such that the received signal is continuously processed, meaning that the portion of the received signal corresponding to the cyclic prefix is processed (i.e., not discarded) along with the data portion of the received signal. The use of continuous processing (i.e., linear convolution as opposed to circular convolution) greatly improves the ability to suppress asynchronous interference at the receiver while the use of filter banks keeps the computational complexity low.

Figure 2:
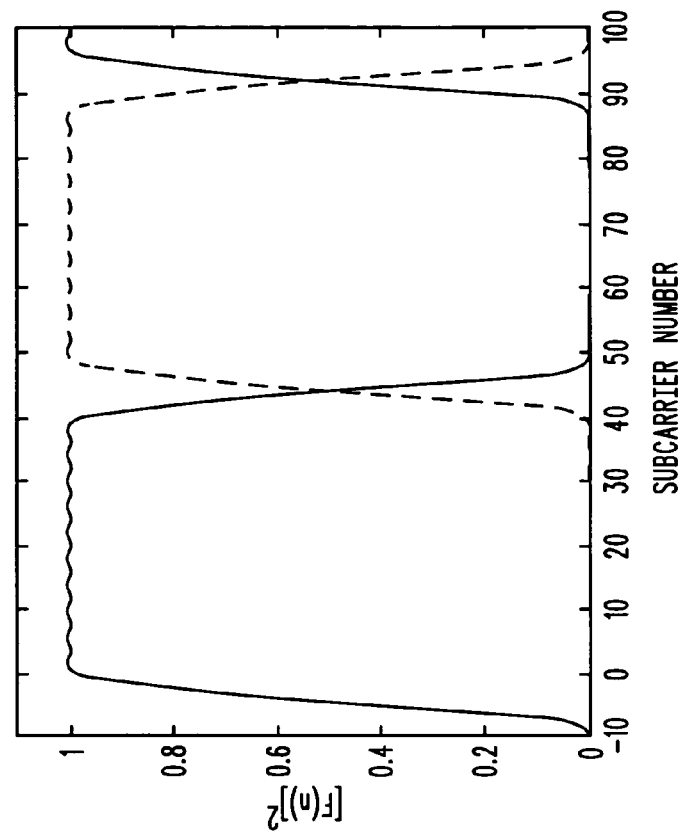
FIG. 2 illustrates a frequency response for the filter of FIG. 1.
Figure 2:
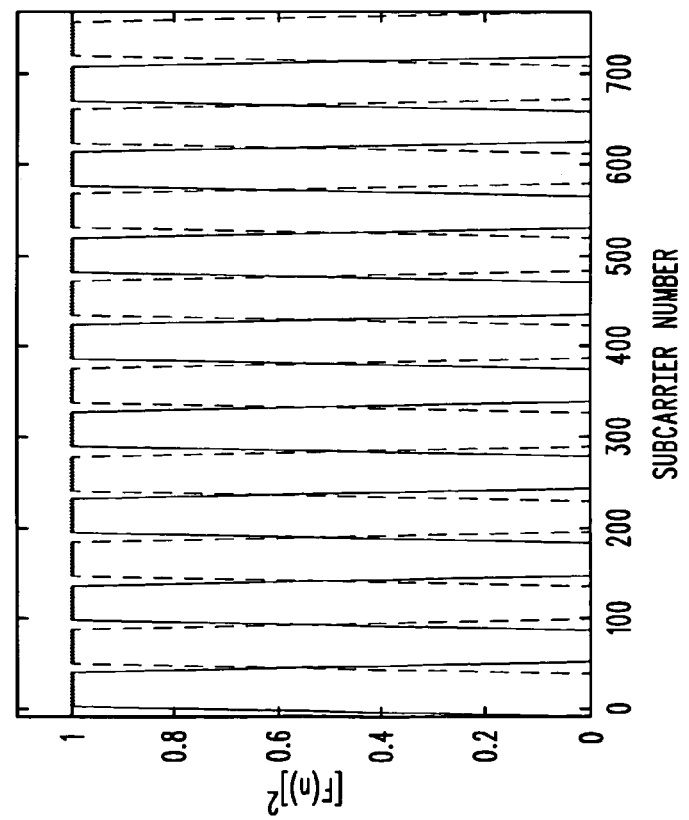

As an example with X=16, FIG. 2 shows the frequency response of a particular filter, f(n), convolved with itself and frequency shifted by center frequencies $\bar{\omega}_1$ through $\bar{\omega}_{16}$. Thus, FIG. 2 shows the 16 particular sub-bands where the interference suppressors 105–106 will operate for this example. The low-pass filter, f(n), was chosen as a pulse with a square-root raised-cosine spectrum with a roll-off factor of 0.2 and a symbol time of 0.8333 μsec. For this example, the center frequencies were given as:

$$\bar{\omega}_l = \frac{2\pi}{N}(.5K - 19 + (l-1)48) \tag{1}$$

where N is an FFT size for the FFT 109 and K is the number of OFDM subcarriers with data (in FIG. 2, N=1024 and K=760). Note that the total bandwidth is broken up into 16 overlapping sections. Also note that the first and last sub-bands have the roll-off portion of the pulse outside of the OFDM signal bandwidth.

Returning to FIG. 1, each filter bank 103–104 outputs X sub-bands/narrowband signals, with like sub-bands (i.e., like center frequencies $\omega_1$ through $\bar{\omega}_X$) being directed to similar interference suppressors 105–106. In particular, each interference suppressor 105–106 has inputs from the various filter banks 103–104, with each input comprising the same particular sub-band. Thus, a first interference suppressor will receive all sub-bands centered at $\omega_1$, while a second interference suppressor will receive all sub-bands centered at $\omega_2$ . . . , etc. Interference suppression then takes place on the particular sub-band, with the output of the interference suppressors 105–106 being a scalar time sequence for the particular sub-band. Since the bandwidth of a sub-band is significantly less than the original signal, the effective length of the channel in each sub-band is much smaller than the original channel length. Therefore, various interference suppression filters (described below) can be designed using a frequency-shifted and filtered version of the pilot sequences where a pilot sequence is a group of symbols transmitted by the desired transmitter that is known by the receiver.

The output of the interference suppressors 105–106 is input into synthesis filter bank 107 where the signals are added to produce a composite interference-suppressed signal. Particularly, synthesis filter bank 107 serves to create the interference-free, equalized, wideband signal d(n) from the various interference-free sub-bands. In other words, the output of the synthesis filter bank 107, d(n), is the equalized time-domain OFDM signal and thus no further equalization is necessary (only the FFT of the appropriate symbols needs to be performed). This is accomplished by up-sampling the outputs of the interference suppressors 105–106, filtering by f(n), then shifting the frequency band of the resulting signal by $\bar{\omega}_1$ through $\bar{\omega}_X$ and finally summing all frequency-shifted signals.

With an estimate of the desired signal d(n) being output from synthesis filter bank 107, normal OFDM processing can be performed on a "clean" signal. Particularly, the cyclic prefix portion of the desired signal d(n) is removed by cyclic prefix remover 108, and standard FFT processing takes place via the FFT 109. The resulting signal is then processed via normal OFDM decoding.

Figure 3:
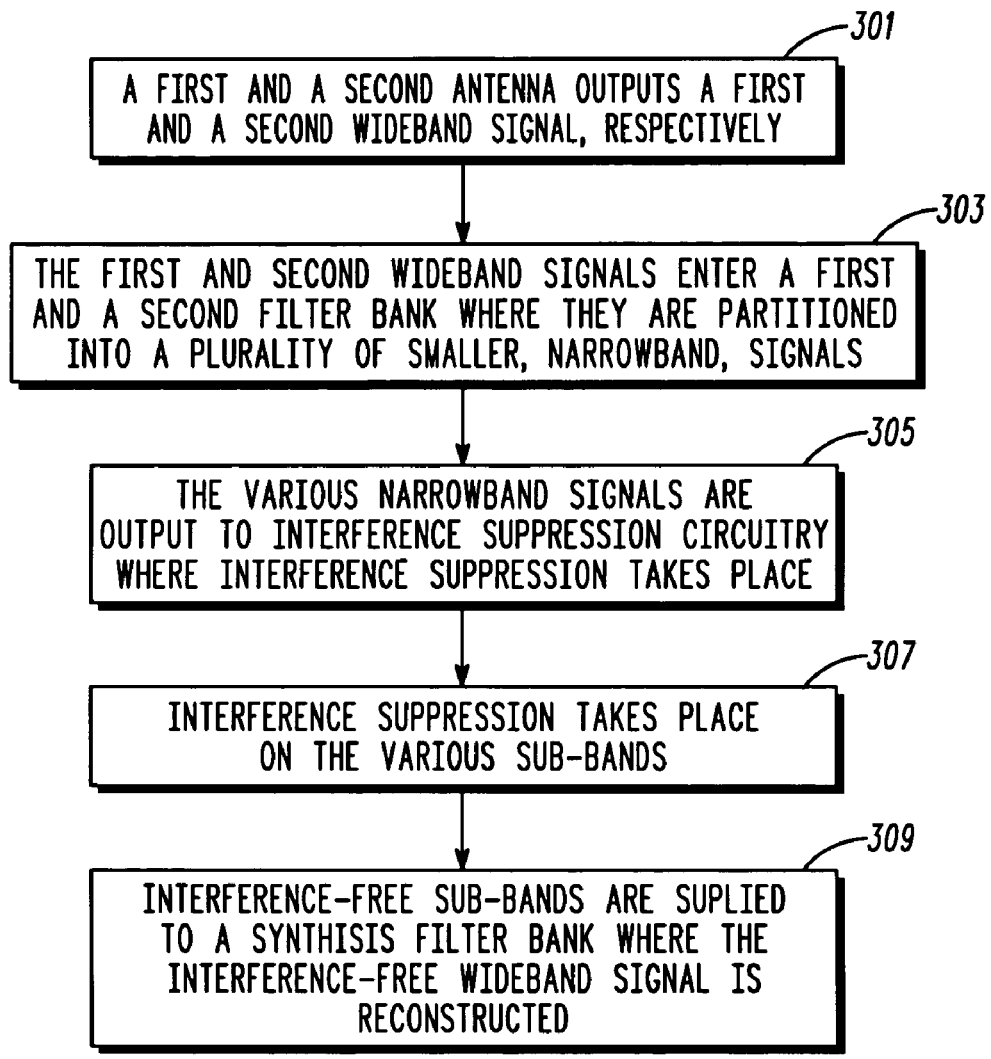
FIG. 3 is a flow chart showing the operation of the receiver of FIG. 1.

FIG. 3 is a flow chart showing the operation of the receiver of FIG. 1. The logic flow begins at step 301 where a first and a second antenna outputs a first and a second wideband signal, respectively. At step 303, the first and the second wideband signals are received at a first and a second filter bank where they are partitioned into a plurality of smaller, narrowband, signals. As discussed above, each filter bank outputs X narrowband signals, each having the same bandwidth in the preferred embodiment and a center frequency of $\overline{\omega}_l$ (l=1, . . . ,X). At step 305, the various narrowband signals are output to interference suppression circuitry 105–106 where interference suppression takes place. Particularly, a single interference suppressor will receive the same sub-band signal output from all filter banks 103–104. For example, interference suppressor 105 will receive all sub-bands centered at $\omega_1$, while interference suppressor 106 may receive all sub-bands centered at $\omega_X$. At step 307 interference suppression takes place on the various sub-bands and the interference-free sub-bands are supplied to synthesis filter bank 107 where the interference-free wideband signal is reconstructed (step 309).

As discussed above, the various interference suppressors can be designed using a frequency-shifted and filtered version of the pilot sequence. Cyclic-prefix communication systems incorporate redundancy by repeating the last $L_{cp}$ symbols in a data block of N symbols at the beginning of the data block. (The interference suppression techniques being described herein are applicable to systems using other forms of cyclic redundancy. For example, the first $L_{cp}$ symbols in a data block of N symbols can be repeated at the end of the data block. In another example, the redundancy can be present at both the beginning and end of the data block. Additionally, these interference suppression techniques are applicable to systems employing no cyclic redundancy) Even after frequency shifting by $-\overline{\omega}_l$ and filtering with f(n) and then decimating, the resulting signal, $y_l(n,b)$, will still have the cyclic prefix property as long f(n) has a finite impulse response (FIR) and has reasonable attenuation in its tails (in the preferred embodiment, f(n) is a pulse with a square-root raised-cosine spectrum). Note that a time block number, b, was added to the resulting signal, $y_l(n,b)$, in order to track the placement of the cyclic prefixes (if present). If the cyclic prefixes are not present, only the pilot-only computation of the interference suppressor that is described below is possible. In a manner similar to that described by H. Cheon and D. Hong, "A Blind Spatio-Temporal Equalizer Using Cyclic Prefix in OFDM Systems," *IEEE ICASSP-2000*, Istanbul, Turkey, the cyclic redundancy in $y_l(n,b)$ can be exploited in finding space-time combining weights that equalize the desired signal and suppress signals whose cyclic prefixes are not time aligned with the desired user (i.e., asynchronous interferers). Basically the blind space-time combining weights operate by making the cyclic prefix portion of the equalized data block equal to the last $L'_{cp}$ symbols of the same equalized data block ($L'_{cp}$ is the effective cyclic prefix length of the OFDM signal after filtering with f(n) and decimating). Let the M×1 received signal for data block b be given as:

$$y_l(n,b) = \sum_{m=0}^{L-1} h_m^l s_l(n-l, b) + z_l(n, b) \quad (2)$$

where $s_l(n,b)$ is the desired user's symbols at time n on block b ($s_l(n,b)$ is found by multiplying the original OFDM signal, d(n) (at the appropriate times), by the phase shift $e^{-j\overline{\omega}_l n}$, filtering by f(n), and then decimating), $h_m^l (0 \leq m \leq l-1)$ is the effective channel (of length L) for filter bank l, and $z_l(n,b)$ incorporates noise plus synchronous and asynchronous interference (the receiver noise and interference will also be multiplied by the phase shift $e^{-j\overline{\omega}_l n}$ and decimated). It is assumed that the received symbols on block b for $0 \leq n \leq N_f-1$ (where $N_f$ is the effective data block size for the decimated signal) are synchronized with the data symbols on block b, $s_l(n,b)$ (recall that the cyclic prefix property implies that $s_l(n,b)=s_l(n+N_f,b-1)$ for $L_{cp} \leq n \leq -1$). Let the M×1 space-time equalizer taps be $g_l(0)$ through $g_l(L_g-1)$ (i.e., $g_l(0)$ through $g_1(L_g-1)$ specify the impulse response of the interference suppressor 105–106 for sub-band l), then the equalized symbols are given by ($L_g$ is the length of the space-time equalizer):

$$\hat{s}_l(n, b) = \sum_{m=0}^{L_g-1} y_l^T(n+D-m, b)g_l(m) \quad (3)$$

where D is the equalizer delay (typically equal to $(L_g+L-1)/2$). The blind equalizer is found by making $\hat{s}_l(n,b)=\hat{s}_l(n+N_f b)$ for $L_{cp}' \leq n \leq -1$ and $1 \leq b \leq B$. Using matrix notation the equalizer can be found as the solution to the following equation:

$$g_l = \arg \min \left\{ \sum_{b=1}^{B} |Y_{l,1}(b)g_l - Y_{l,2}(b)g_l|^2 \right\} \quad (4)$$

where $ML_g \times 1$ $g_l=[g_l^T(0), \ldots, g_l^T(L_g-1)]^T$, and $L_{cp} \times ML_g$ $Y_{l,1}(b)$ and $Y_{l,2}(b)$ are:

$$Y_{l,1}(b) = \begin{bmatrix} y_l^T(-1+D, b) & \cdots & y_l^T(D-L_g, b) \\ y_l^T(-2+D, b) & \cdots & y_l^T(-1+D-L_g, b) \\ \vdots & & \vdots \\ y_l^T(-L_{cp}'+D, b) & \cdots & y_l^T(-L_{cp}'+D-L_g+1, b) \end{bmatrix} \quad (5)$$

$$Y_{l,2}(b) = \begin{bmatrix} y_l^T(N_f-1+D, b) & \cdots & y_l^T(N_f+D-L_g, b) \\ y_l^T(N_f-2+D, b) & \cdots & y_l^T(N_f-1+D-L_g, b) \\ \vdots & & \vdots \\ y_l^T(N_f-L_{cp}'+D, b) & \cdots & y_l^T(N_f-L_{cp}'+D-L_g+1, b) \end{bmatrix} \quad (6)$$

Simplifying the above equations, $g_l$ is found as the non-trivial (i.e., non-zero) solution to:

$$g_l = \arg \min \{g_l^H Y_l g_l\} \quad (7)$$

where:

$$Y_l = \sum_{b=1}^{B} (Y_{l,1}(b) - Y_{l,2}(b))^H (Y_{l,1}(b) - Y_{l,2}(b)) \quad (8)$$

One non-trivial solution is to choose $g_l$ as the eigenvector associated with the smallest eigenvalue of $Y_l$. Note that this solution is completely blind and thus will tend to significantly under-perform pilot-based techniques and will have a scalar and phase ambiguity. In addition, this blind equalizer will also have difficulties when an unknown interferer is synchronous, meaning that the interferer's cyclic prefixes line up in time with the desired signal.

However, when a limited number of pilots symbols are available, the above blind equalizer can be used with the pilots to find an excellent semi-blind equalizer in the presence of both asynchronous and synchronous interference. The semi-blind estimator modifies (7) by adding a term to account for the known pilot sequence (symbols). Assuming that there is one block (including cyclic prefix) of all known time-domain pilots, (7) becomes:

$$g_f = \arg \min \{\gamma g_f^H Y_f g_f + |Y_{l,3} g_f - s_l|^2\} \quad (9)$$

where $\gamma$ is a weighting that can emphasize/de-emphasize the blind minimization versus the pilot minimization (in the preferred embodiment $\gamma=1$), and $(N_f + L_{cp}') \times ML_g$ $Y_{l,3}$ and $(N_f + L_{cp}') \times 1$ $s_l$ are given by (data block b=1 is assumed to contain the pilot symbols):

$$Y_{l,3} = \begin{bmatrix} y_l^3(N_f - 1 + D, 1) & \cdots & y_l^3(N_f + D - L_g, 1) \\ y_l^3(N_f - 2 + D, 1) & \cdots & y_l^3(N_f - 1 + D - L_g, 1) \\ \vdots & & \vdots \\ y_l^3(-L_{cp}' + D, 1) & \cdots & y_l^3(-L_{cp}' + D - L_g + 1, 1) \end{bmatrix} \quad (10)$$

$$s_l = \begin{bmatrix} s_l(N_f - 1, 1) \\ s_l(N_f - 2, 1) \\ \vdots \\ s_l(-L_{cp}', 1) \end{bmatrix} \quad (11)$$

Note that $Y_{l,3} g_l$ is simply the equalized symbols and the equalizer is designed to minimize the mean square error between the equalized symbols and the pilots (along with the blind criteria). The solution to (9) is:

$$g_f = (\gamma Y_f + Y_{l,3}^H Y_{l,3})^{-1} Y_{l,3}^H s_l \quad (12)$$

Thus, in the various embodiments of the present invention three interference suppression techniques may be utilized by interference suppressors 105–106. The first technique is a blind-only technique in that it does not need pilot symbols to compute the interference suppression filters but instead uses the cyclic redundancy (i.e., cyclic prefix) in the transmitted desired signal to design the interference suppression filter. The second technique is a pilot-only method that designs the interference suppression filter to operate using pilot symbols while not taking into account the cyclic redundancy in the transmitted desired signal. (Thus this pilot-only technique can be used for systems with no cyclic redundancy). Finally, the third technique is a semi-blind method that designs the interference suppression filter to operate using pilot symbols while also taking into account the cyclic redundancy in the transmitted desired signal.

While the invention has been particularly shown and described with reference to a particular embodiment, it will be understood by those skilled in the art that various changes in form and details may be made therein without departing from the spirit and scope of the invention. For example, the specific implementation of the filter bank in this invention is just one possible implementation. Other implementations of a filter bank are possible and will result in an equivalent receiver. For example, as specified in J. G. Proakis and D. G. Manolakis, *Digital Signal Processing*, Second Edition, Macmillan Publishing, New York, 1992, instead of having a single low-pass filter f(n), an equivalent implementation is to use a different band-pass filter, $f_1(n)$ through $f_X(n)$, for each of the X center frequencies. In the equivalent implementation after band-pass filtering, each of the X signals is then decimated by X and then shifted in frequency (as opposed to frequency shifting, filtering by low-pass f(n) and then decimating by X). It is intended that such changes come within the scope of the following claims.

What is claimed is:

1. An apparatus comprising:
    a first antenna outputting a first wideband signal;
    a second antenna outputting a second wideband signal;
    a first filter bank coupled to the first antenna, receiving the first wideband signal and outputting a first plurality of narrowband signals;
    a second filter bank coupled to the second antenna, receiving the second wideband signal and outputting a second plurality of narrowband signals;
    an interference suppressor receiving a first narrowband signal from the first filter bank and a second narrowband signal from the second filter bank and outputting an interference-suppressed signal based on the first and the second narrowband signals;
    synthesis circuitry receiving the interference-suppressed signal and a plurality of other interference-suppressed signals, and outputting a composite interference-suppressed signal based on the interference-suppressed signal and the plurality of other interference-suppressed signals;
    an FFT processor receiving the composite interference-suppressed signal and performing FFT processing on the signal; and
    wherein the first and the second filter banks operate continuously in a linear convolution fashion prior to FFT processing.

2. The apparatus of claim 1 wherein the first and the second narrowband signals exist within a same sub-band.

3. The apparatus of claim 2 further comprising:
    a second interference suppressor receiving a third narrowband signal from the first filter bank and a fourth narrowband signal from the second filter bank and outputting a second interference-suppressed signal based on the first and the second narrowband signals, wherein the third and the fourth narrowband signals exist within a same sub-band.

4. The apparatus of claim 1 wherein the interference suppressor suppresses interference via a blind-only technique that does not require pilot symbols to compute interference suppression filters.

5. The apparatus of claim 1 wherein the interference suppressor utilizes a cyclic prefix to suppress interference.

6. The apparatus of claim 5 wherein the interference suppressor additionally utilizes transmitted pilot symbols in suppressing interference.

7. The apparatus of claim 1 wherein the interference suppressor utilizes transmitted pilot symbols in suppressing interference.

8. An apparatus for interference suppression, the apparatus comprising:
    a first antenna outputting a first wideband time-domain signal $r_1(n)$;
    a second antenna outputting a second wideband time-domain signal $r_2(n)$;
    a first filter bank coupled to the first antenna, receiving $r_1(n)$ and outputting X narrowband time-domain signals, wherein each narrowband time-domain signal has a center frequency of $\overline{\Omega}_l$ (l=1, . . . , X);
    a second filter bank coupled to the second antenna, recieving $r_2(n)$ and outputting X narrowband time-domain signals, wherein each narrowband time-domain signal has a center frequency of $\overline{\Omega}_l$ (l=1, ..., X);

a first interference suppressor receiving a first narrowband time-domain signal from the first filter bank and a second narrowband time-domain signal from the second filter bank and outputting a first interference-suppressed time-domain signal based on the first and the second narrowband time-domain signals, wherein the first and the second narrowband time-domain signals have a same center frequency; and a second interference suppressor receiving a third narrowband time-domain signal from the first filter bank and a fourth narrowband time-domain signal from the second filter bank and outputting a second interference-suppressed time-domain signal based on the third and the fourth narrowband time-domain signals, and wherein the third and the fourth narrowband time-domain signals have a same center frequency wherein the first and the second filter banks operate continuously in a linear convolution fashion.

9. The apparatus of claim 8 further comprising:

synthesis circuitry receiving the first and the second interference-suppressed time-domain signals, and outputting a composite interference-suppressed time-domain signal based on the first and the second interference-suppressed time domain signals.

10. The apparatus of claim 8 wherein the first and the second interference suppressors suppress interference via a blind-only technique that does not require pilot symbols to compute interference suppression filters.

11. The apparatus of claim 8 wherein the first and the second interference suppressors utilize a cyclic prefix to suppress interference.

12. The apparatus of claim 11 wherein the first and the second interference suppressors additionally utilizes transmitted pilot symbols in suppressing interference.

13. The apparatus of claim 8 wherein the first and the second interference suppressors utilize transmitted pilot symbols in suppressing interference.

14. A method comprising the steps of:

receiving a wideband time-domain signal at a first filter bank;

receiving the wideband time-domain signal at a second filter bank;

outputting a first narrowband time-domain signal having a first center frequency from the first filter bank based on the wideband time-domain signal;

outputting a second narrowband time-domain signal having the first center frequency from the second filter bank based on the wideband time-domain signal;

receiving the first and the second narrowband time-domain signals and performing interference suppression on the first and the second narrowband time-domain signals; and wherein the step of performing interference suppression comprises the step of utilizing transmitted pilot symbols to perform interference suppression.

15. The method of claim 14 wherein the step of performing interference suppression comprises the step of utilizing transmitted pilot symbols to perform interference suppression.

16. The method of claim 14 wherein the step of performing interference suppression comprises the step of utilizing a cyclic prefix in performing interference suppression.

17. An apparatus comprising:

a first antenna outputting a first wideband signal;

a second antenna outputting a second wideband signal;

a first filter bank coupled to the first antenna, receiving the first wideband signal and outputting a first plurality of narrowband time-domain signals;

a second filter bank coupled to the second antenna, receiving the second wideband signal and outputting a second plurality of narrowband time-domain signals;

an interference suppressor receiving a first narrowband time-domain signal from the first filter bank and a second narrowband time-domain signal from the second filter bank and outputting an interference-suppressed time-domain signal based on the first and the second narrowband time-domain signals; and wherein the first and the second filter banks operate continuously in a linear convolution fashion.

* * * * *